Patented July 13, 1937

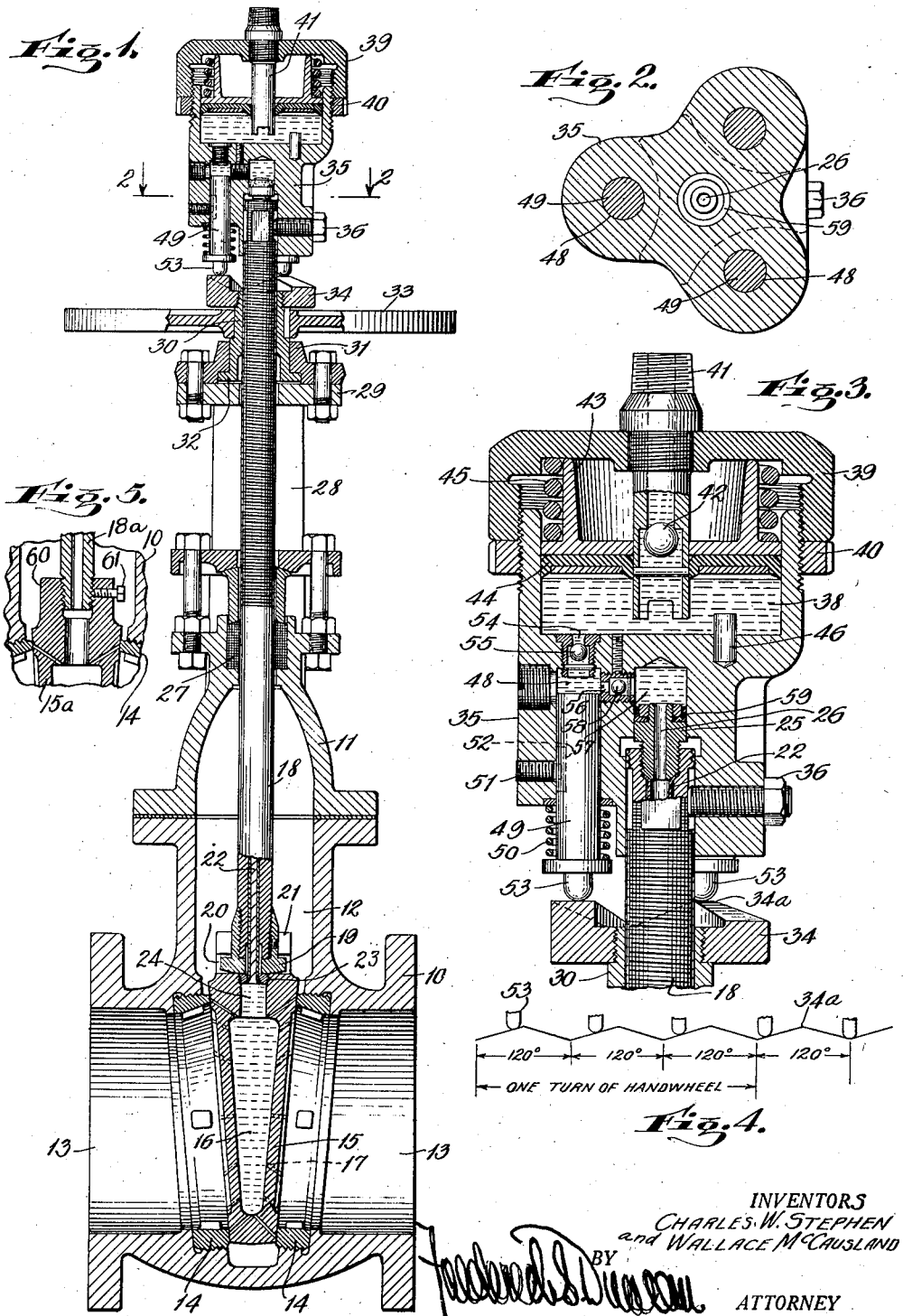

2,086,725

UNITED STATES PATENT OFFICE 2,086,725

LUBRICATED VALVE

Wallace McCausland and Charles W. Stephen, Bridgeport, Conn., assignors, by mesne assignments, to American Chain & Cable Company, Inc., a corporation of New York Application April 8, 1931, Serial No. 528,566

18 Claims. (Cl. 251—20)

The present invention relates to valves of the type having means for introducing lubricant between the seating surfaces thereof and has for an object to provide automatic means for forcing lubricant between said surfaces whenever the valve is operated.

The generic invention of self-lubricated valves is covered in a copending application Serial No. 528,565, filed April 8, 1931, which application covers specifically valves of the rotary plug type. The present invention has for an object to provide a novel form of lubricant forcing means.

A more specific object is to provide automatic lubricant forcing means for valves in which the closure member is bodily displaced instead of being rotated to open and close the fluid passage of the valve.

Our present invention will be found particularly adaptable for use with gate valves to provide a seal between the gate and its seat and also to overcome binding of the gate in its seat and has for an object to provide a structure in which a common operating means may be employed for raising and lowering the gate and for forcing lubricant to the seat whereby lubricant will be automatically forced to the seat when the gate is operated.

Another object is to provide such connection between the operating means and the gate that the lubricant may be forced to the seating surface while the gate remains closed.

In a copending application Serial No. 528,568, filed April 8, 1931, we disclose a gate valve which carries out the above named objects. However, the present invention differs therefrom in providing a lubricant forcing means which, while automatically operable by the means with which the gate is raised and lowered, cannot be operated except when the gate is actually or substantially seated so that there is no danger of forcing lubricant into the valve when the valve is open.

Other objects and advantages of the present invention will appear in the following description of certain embodiments and thereafter the novelty and scope of the invention will be pointed out in the claims.

In the accompanying drawing;

Fig. 1 is a view in vertical section of a gate valve embodying our invention;

Fig. 2 is a view in section taken on the line 2—2 of Fig. 1;

Fig. 3 is a view on an enlarged scale of the pump portion of Fig. 1;

Fig. 4 is a development of a cam showing successive positions of a pump plunger operated thereby; and Fig. 5 is a fragmental detail view of a modified connection between the gate and its stem.

The valve shown in the drawing is of the type in which lubricant is fed through the valve stem to the seating surfaces of the gate and the construction of the valve body and gate is substantially the same as that described in our copending application Serial No. 528,567, filed April 8, 1931, and now Patent No. 2,032,882, granted March 3, 1936. The valve comprises a body 10 to which is secured a bonnet 11. The body portion is formed with a central chamber 12 closed by the bonnet. Into the chamber 12 lead a pair of opposed and alined fluid passages 13, and in the chamber at the mouth of each of said passages there is a threaded recess to receive a seat ring 14. These seat rings are disposed at an acute angle to each other to receive a wedge type gate 15 formed with annular seating faces adapted to seat upon the seat rings.

The wedge 15 is formed with a chamber 16 from which ducts 17 lead to the seating faces of the wedge. A hollow valve stem 18 is provided with a squared or angular head 19 which engages a slot 20 formed in the upper end of the gate. Cheek pieces 21 overlap the head, thereby providing an operative connection between the stem and the wedge. Owing to the fact that the head is squared, it cannot rotate with respect to the wedge, but there is a certain amount of lost motion vertically between the head and the wedge; also the wedge may adjust itself laterally with respect to the stem so as to seat tightly between the seat rings.

A flexible tube 22 passes through the hollow stem and at its lower end is secured to a bushing 23 fastened in the mouth 24 of the chamber 16. The upper end of the tube 22 is flared, as best shown in Fig. 3, and is clamped against a flared shoulder in the stem by means of a set screw 25. This set screw is formed with a central bore 26, whereby communication with the chamber 16 is had through the set screw 26 and flexible tube 22. The latter is sufficiently flexible to allow for the play of the head 19 with respect to the wedge 15.

The bonnet 11 is formed with the usual stuffing box 27 through which the stem 18 passes. Mounted on the bonnet and bolted thereto is a bracket 28 provided at its upper end with a thrust plate 29 against which a nut 30 may bear. This nut is held to the thrust plate 29 by a flanged retaining ring 31 overlapping a flange 32 formed on the nut, but the latter may be allowed a certain amount of play between the plate 29 and the ring 31. The nut is threaded upon the stem 18 so that by turning the nut the wedge may be raised and lowered. A hand wheel 33 is keyed to the nut to facilitate turning the same.

Secured to the upper end of the nut, above the hand wheel 33, is a face cam 34 which, as will be explained presently, controls the operation of a pump by means of which lubricant is forced into the gate chamber 16. This cam is formed with three swells 34a (see Fig. 4) located 120 degrees apart.

The casing 35 of the pump is screwed upon the upper end of the stem 18 and is held against turning with respect to the stem by means of a set screw 36. The latter engages a squared portion of the stem 18, providing means for locking the pump casing at any desired vertical adjustment with respect to the stem.

The upper end of the pump casing 35 is formed in the shape of a cup to provide a reservoir 38 for lubricant. The cup is closed by a cap 39 screwed thereon and secured at the desired adjustment by a lock nut 40. A hollow stem 41 passes through the cap and provides an intake pipe through which lubricant may be introduced into the chamber 38. Within the stem 41 is a check valve 42 opening toward the reservoir. A plunger 43 is mounted to slide on the stem 41 and is provided with a cup leather 44 which fits the cup 38. A spring 45 bearing between the plunger 43 and the cap 39 tends to maintain pressure upon the lubricant in the chamber 38. A pin 46 rising from the floor of the cup limits the extent to which the plunger may be pressed into the reservoir.

The pump casing 35 is provided with three vertical bores or working chambers 48 in which slide three plungers 49. Each plunger is urged downwardly by a spring 50 but is limited in its downward movement by a set screw 51 engaging a slot 52 in the plunger. The lower end of each plunger 49 is formed with a rounded head 53 adapted to engage the cam 34. The upper end of each working chamber 48 is provided with an intake port 54 leading from the reservoir 38 and with a check valve 55 in the port, opening away from the reservoir. Each working chamber also has an outlet port 56 near its upper end extending laterally into a central chamber 57, and a check valve 58 is provided in each of said outlet ports, opening toward the chamber 57. The set screw 25 carries a cup leather 59 adapted to fit the side walls of the chamber 57 so as to prevent leakage of lubricant from said chamber past the set screw 26 and to the outside of the stem 18.

The operation of the pump is as follows: Assuming that the wedge 15 is seated in the seat rings 14 and that the parts are in the position shown in Fig. 1, to open the valve the hand wheel 33 is turned and when so doing the cam 34 will strike the heads 53 of the plungers 49. Owing to the lost motion between the head 19 and the wedge, as well as the play of the nut and the back lash in the threads connecting the nut and stem, the hand wheel may be given a full turn or more before any lifting action will take place and during this rotation of the hand wheel the plungers 49 will be raised by the cam swells and lowered by the springs 50. This will cause lubricant to be drawn from the reservoir 38 and be forced into the stem chamber 57, thereby building up pressure in the chamber 16 of the wedge to force lubricant between the seating surfaces of the valve. If the valve is very tightly held, it may be necessary to oscillate the hand wheel back and forth several times in order to build up sufficient pressure to force the wedge off its seat. However, under normal conditions, it is merely necessary to turn the hand wheel 33 in the lifting direction and this will automatically pump sufficient lubricant into the chamber 16 to overcome binding of the wedge in its seat. Thereupon further turning of the hand wheel 33 will cause the wedge to rise and with the wedge the pump will be raised clear of the cam. When the cam is thus cleared, the plungers 49 will all be in their lowermost position and lubricant will then be forced out of the reservoir 38 into the working chambers of the pump by the pressure of the spring 45. Thus, the working chamber will be filled and will be ready to be operated as soon as the gate valve is closed. Upon closing the valve the pump will descend with the gate and by the time the gate reaches its seat the pump plungers will strike the cam swells 34a and pump lubricant into the chamber 16 to replenish any lubricant that might have been lost while the valve was open, and also, after the valve is closed, will force sufficient lubricant between the seating surfaces to effect a tight seal.

Fig. 4 shows the successive positions of one of the plunger heads 53 while the hand wheel is turning through 480 degrees. As the pump is carried downward with the stem each plunger head 53 will be given a slight upward throw by the first cam swell it encounters and will then be given a bigger throw by the next and so on until the hand wheel has made a rotation and a third by which time the plunger head 53 will have reached the bottom of the depression between the swells of the cam. Obviously, the particular form of the cam may be varied at will and under certain conditions it may be necessary to provide for cam operation of the pump during more or less than a one and a third turns of the hand wheel. Therefore, we do not wish to limit our invention to the particular cam construction shown. We would point out, however, that the play of the head 19 with respect to the wedge 15 and of the nut in its support, as well as the back lash between the threads of the stem 18 and those of the nut 30, provide sufficient play to permit of operating the pump plungers without moving the wedge 16. However, once the valve has left its seat the pump is raised clear of the cam so that it will be impossible for a meddlesome or careless person to operate the pump.

In Fig. 5, we show a slight modification in the connection between the gate and its stem. The gate 15a differs from the gate 15 only in the fact that it is formed with an internally threaded sleeve extension 60 into which the lower end of a hollow valve stem 18a is screwed, a set screw 61 serving to lock the stem to the gate. The stem 18a is substantially like the stem 18 but it contains no inner flexible tube 22. Instead, lubricant is pumped directly through the hollow stem into the lubricant chamber in the gate. Although this construction provides a rigid connection between the gate and the stem, yet we have found that there is enough flexibility in the parts to permit of seating the gate properly against the seat rings 14.

While we have described certain embodiments of our invention, we wish it to be understood that the invention is not limited to a gate valve nor is it limited to the particular details of construction described and that we reserve the right to make such changes or modifications in form, structure and general arrangement as fall within the spirit and scope of the following claims.

We claim:

1. A valve comprising a body formed with a fluid passage therethrough, a closure member operable to open and close said passage, a pump for forcing lubricant between the closure member and the body, and a connection between the pump and the closure member whereby the pump is operable only when the closure member is in substantially closed position.

2. A valve comprising a body member formed with a fluid passage therethrough, a closure member, means for causing relative movement of said members to open and close said passage, a pump connected to one of said members, and a pump operating element connected to the other of said members, said element and pump being so relatively located as to be brought into operative engagement only when the closure member is in substantially closed position.

3. A valve comprising a body member formed with a fluid passage therethrough, a closure member, means for causing relative movement of said members to open and close said passage, a pump connected to one of said members, and a pump operating element connected to the other of said members and driven by said means, said element and said pump being so located as to be brought into operative engagement only when the closure member is in substantially closed position.

4. A gate valve comprising a gate, a casing formed with a seat for the gate, mechanism for moving the gate toward and from its seat, a pump for forcing lubricant to said seat, and an element actuated by said mechanism for operating said pump only when the gate is substantially in engagement with said seat.

5. A gate valve comprising a gate, a casing formed with a seat for the gate, mechanism for moving the gate toward and from its seat, means for forcing lubricant to said seat, and a cam actuated by said mechanism for operating said means only when the gate is substantially in engagement with said seat.

6. A gate valve comprising a gate, a casing formed with a seat for the gate, mechanism for moving the gate toward and from its seat, means for forcing lubricant to said seat, and a cam actuated by said mechanism for operating said means only when the gate is substantially in engagement with said seat, said mechanism including a lost motion connection to the gate whereby said means may be operated without operating the gate.

7. A gate valve comprising a casing formed with a fluid passage therethrough, a gate, a device mounted on the casing for raising and lowering the gate to open and close the passage, a pump for pumping lubricant to a seating surface of the gate, and a cam on said device for operating said pump, the latter being connected to the gate in such position as to engage the cam only when the gate is substantially closed.

8. A gate valve comprising a casing formed with a fluid passage therethrough, a gate, means rotatable on the casing for raising and lowering the gate to open and close the passage, a pump for pumping lubricant to a seating surface of the gate, and a cam on said means for operating the pump, the latter being connected to the gate in such location as to engage the cam only when the gate is substantially closed.

9. A gate valve comprising a gate, a body formed with a seat for the gate, a member connected to the gate, another member carried by the body, means for causing relative motion of said members to raise and lower the gate, a pump adapted to force lubricant between the gate and its seat, said pump being carried by one of said members, and a cam carried by the other member for operating the pump, the pump and the cam being so located as to be brought into operative engagement during a limited part of the relative movement of said members.

10. A gate valve comprising a body formed with a fluid passage therethrough, a gate controlling said passage, a non-rotary stem connected to the gate, a nut threaded on the stem and mounted to rotate in the body, means for rotating the nut to open and close the gate, a cam driven by said means, and a pump having a plunger reciprocable by the cam to force lubricant to a seating surface of the gate, the pump being mounted on the stem in such location as to be brought into operative engagement with the cam when the gate is in substantially closed position.

11. A gate valve comprising a body formed with a fluid passage therethrough, a gate controlling said passage, a non-rotary stem connected to the gate, a nut threaded on the stem and mounted to rotate in the body, means for rotating the nut to open and close the gate, a face cam on the nut, a pump having a plunger reciprocable by the cam to force lubricant to a seating surface of the gate, the pump being mounted on the stem in such location as to be brought into operative engagement with the cam when the gate is in substantially closed position, and means for adjusting the location of the pump on the stem.

12. A gate valve comprising a body formed with fluid passage therethrough, a gate controlling the passage, a non-rotary stem connected to the gate, a nut threaded on the stem and mounted to rotate in the body, means for rotating the nut to open and close the gate, a face cam on the nut and a pump for forcing lubricant to a seating surface of the gate, said pump comprising a spring-pressed plunger adapted to be reciprocated by the cam, the pump being mounted on the stem in such location as to be brought into operative engagement with the cam when the gate is in substantially closed position, and the stem having lost motion connection permitting limited operation whereby the pump may be operated without operating the gate.

13. A gate valve comprising a body formed with a fluid passage therethrough, a gate operable in the body to open and close said passage, a non-rotary stem connected to the gate, a nut threaded on the stem and mounted to rotate in the body, means for rotating the nut, a face cam driven by said means, a reservoir for lubricant, a pump, the reservoir and pump being mounted upon the stem, a conduit leading from the pump to a seating surface of the gate, said pump including a plunger operable by engagement with the cam to pump lubricant from the reservoir into said conduit, the pump being so located as to be brought into operative engagement with the cam when the gate is in substantially closed position.

14. A gate valve comprising a body formed with a fluid passage therethrough, a gate operable in the body to open and close said passage, a non-rotary stem connected to the gate, a nut threaded on the stem and mounted to rotate in the body, means for rotating the nut, a face cam driven by said means, a reservoir for lubricant, a pump, the reservoir and pump being mounted upon the stem, a conduit leading fom the pump to a seating surface of the gate, said pump including a plurality of spring-pressed plungers reciprocable by engagement with the cam to pump lubricant from the reservoir into said conduit, the pump being so located as to be brought into operative engagement with the cam when the gate is in substantially closed position.

15. A gate valve comprising a body formed with a fluid passage therethrough, a gate operable in the body to open and close the passage, the gate being formed with a lubricant chamber and ducts leading therefrom to a seating surface of the gate, a hollow stem fixed to the gate and communicating with said chamber, a nut threaded on the stem and mounted to rotate in the body, means for rotating the nut to open and close the gate, a cam on the nut, a pump having a plunger reciprocable by the cam to force lubricant through the stem into the chamber, the pump being mounted on the stem in such location as to be brought into operative engagement with the cam when the gate is in substantially closed position.

16. A valve provided with a valve housing having a tapered valve seat, a tapered valve member movable on said seat, a valve stem secured to said valve member and provided with a lubricant chamber adapted to communicate with said valve seat, an operating member whereby the valve is opened and closed, and means whereby lubricant is transmitted from said lubricant chamber to said valve seat in response to movements of said valve stem and operating member.

17. A valve comprising a casing formed with a fluid passage therethrough, a closure element operable in the casing to open and close the passage, a stem member connected to the closure element, an operating member having lost motion connection with the stem and operable in one direction to move the closure element to close the passage and in the opposite direction to open the passage, a pump and a lubricant reservoir carried by one of the members, conduit means leading from the pump to convey lubricant therefrom to a point between the closure element and the casing, and means carried by the other of the members and adapted to operate the pump by relative movement of the members in either direction to pump lubricant from the reservoir into said conduit means.

18. A valve comprising a casing formed with a fluid passage therethrough, a closure element operable in the casing to open and close the passage, a stem connected to the closure element, an operating member having lost motion connection with the stem and operable in one direction to move the closure element to close the passage and in the opposite direction to open the passage, a pump and a lubricant reservoir mounted on the stem, conduit means leading from the pump and adapted to convey lubricant therefrom to a point between the closure element and the casing, means carried by said operating member and adapted to operate the pump by relative movement of the members in either direction to pump lubricant from the reservoir into said conduit means.

WALLACE McCAUSLAND.
CHARLES W. STEPHEN.